J. GEISSLINGER.
DYNAMO ELECTRIC MACHINE.
APPLICATION FILED MAY 23, 1912.
1,210,638.
Patented Jan. 2, 1917.
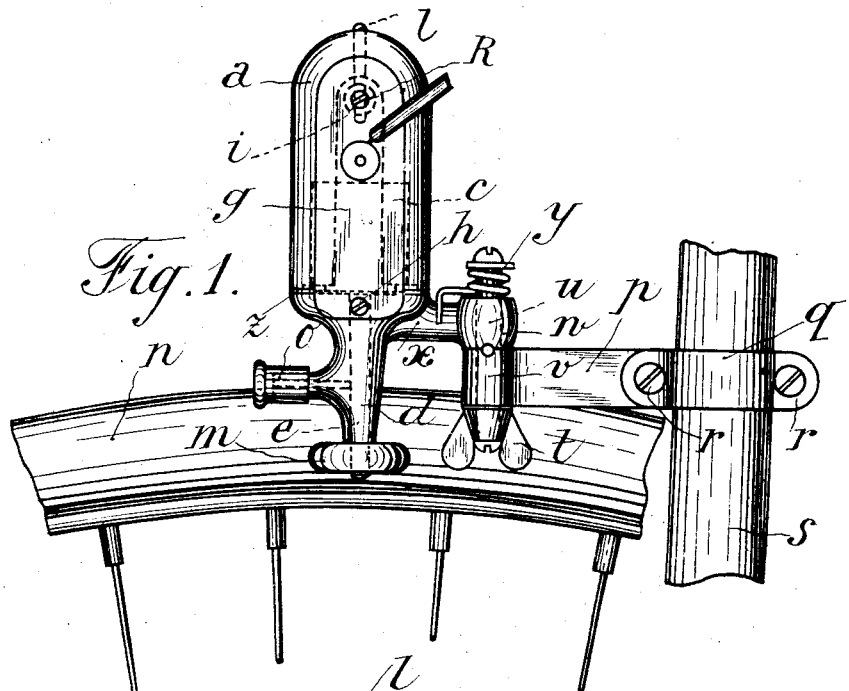
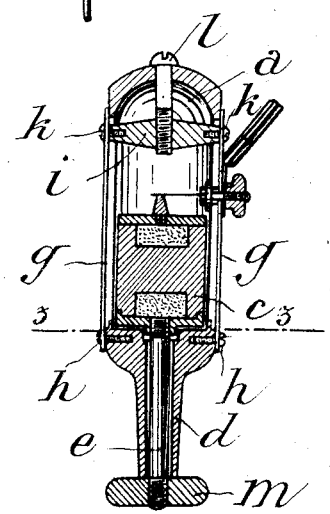
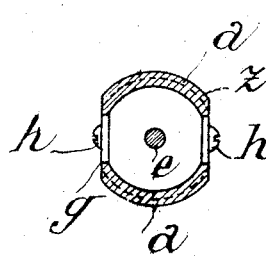
Witnesses:
Geo. T. Pinckney
J. B. Le Blanc
Inventor,
Johann Geisslinger,
By Serrell & Son,
his Attorneys.

UNITED STATES PATENT OFFICE.

JOHANN GEISSLINGER, OF GENEVA, SWITZERLAND, ASSIGNOR, BY DIRECT AND MESNE ASSIGNMENTS, OF ONE-HALF TO FABRIQUE INTERNATIONALE D'APPAREILS A MAGNETO S. A. (F. I. A. M.), OF GENEVA-ACACIAS, SWITZERLAND, AND ONE-HALF TO MARBURG BROTHERS, OF NEW YORK, N. Y., A CORPORATION.

DYNAMO-ELECTRIC MACHINE.

1,210,638.                Specification of Letters Patent.                Patented Jan. 2, 1917.

Application filed May 23, 1912.  Serial No. 699,099.

*To all whom it may concern:*

Be it known that I, JOHANN GEISSLINGER, a subject of the Emperor of Germany, residing at Geneva, Canton of Geneva, in the Confederation of Switzerland, have invented certain new and useful Improvements in Dynamo-Electric Machines, of which the following is a specification.

The present invention relates to magneto electric generators and particularly to a type well adapted for lighting electric lamps wherein the generator is simple and inexpensive in construction, is readily installed for driving, and is reliable in operation with but little attention, although it may be quickly disassembled for inspection or repair.

In the accompanying drawings illustrating the preferred form of my invention associated with a motorcycle, as an example, Figure 1 is an elevation of the generator supported from the frame of the cycle and arranged to be driven by frictional engagement with the tire; Fig. 2 is a longitudinal central section of the generator at right-angles to Fig. 1, Fig. 3 is a section on line 3—3 of Fig. 2; Fig. 4 is a fragmentary detail view particularly showing the manner in which the bearing member abuts the ends of the magnet arms.

The generator is of the magneto type having a one-piece permanent field magnet $a$ without any attached pole pieces. The magnet has an inner cylindrical-shaped face with its axis of curvature along the length of the arms of the magnet, that is from the poles toward the arch between the arms, while the outside surface of the magnet is similarly curved but has flat surfaces along the sides adjacent the openings between the arms. Thus the magnet has a substantially annular shape in cross section with flat surfaces along its outer sides, as shown in Fig. 3. The outer ends of the magnet arms have circular ledges $z$ in smooth surface contact with the depending flange on the out-board bearing $d$ which is made of non-magnetic metal. The shaft $e$ extends in a single direction from the armature $c$ through the bearing $d$ and thereby supports the armature in an overhung position within the magnet and between the poles thereof. In this way a second bearing within the magnet or otherwise arranged is rendered unnecessary for supporting the armature in position for rotation. Furthermore, the bearing $d$ abuts the ends of the magnet arms and constitutes an end closure for the magnet. The oil cup $o$ furnishes lubricant for the bearing. The plates $g$ of non-magnetic metal are seated on the flat outer surfaces of the magnet and constitute a closure for the open spaces between the arms thereof. In this way the magneto is entirely inclosed so that the armature is free from dust and exposure.

The transverse support $i$ is fastened by the screw $l$ to the arch of the magnet intermediate of the outer ends of the arms, and it extends transversely to the open spaces between the arms. The plates $g$ are fastened to the transverse support $i$ by the screws $h$ and to the bearing $d$ by the screws $h$, so that the bearing is supported from the magnet in such manner that the armature $c$ is securely held in centered position between the poles of the magnet with its axis of rotation coincident with the axis of curvature of the surfaces of the magnet arms. The armature is of the shuttle-wound type with its periphery separated by a small air gap from the inner face of the magnet arms. The friction roller $m$ is fastened on the outer end of the armature shaft $d$ in frictional engagement with the tire, so that the armature is driven at comparatively high speed relatively to the speed of the motor-cycle. By simply removing the screws $h$ the magnet $a$ may be withdrawn from around the armature and the generator inspected and repaired.

The generator is supported from the frame $s$ of the motor cycle by a clip $q$ fastened by a screw $r$ to the end of a bracket arm $p$, which is provided with an eye $v$ at the other end. The bearing $d$ has an extension $x$ terminating in an eye $w$. The bolt $u$ having the winged nut $t$ extends through the eyes $v$ and $w$, while the spring $y$ serves to continually press the roller $m$ into driving frictional engagement with the tire. The electric current produced in the generator armature as a result of its rotation is conducted through the sliding contact and the wire shown in Fig. 2 to the incandescent or other electric lamp or lamps to be lighted.

It will be apparent that the ideas herein disclosed may be embodied in various forms of magneto electric generators within the scope of my invention, and that the generator may be used for lighting or other purposes in association with other forms of moving vehicles, or for stationary use.

Having thus described my invention, what I claim is:—

1. In a magneto electric generator, a permanent field magnet of the horse-shoe type, a bearing member abutting the outer ends of the magnet arms, an armature rotatable between the poles of the magnet on an axis along the length of the magnet arms and having a shaft extending from one end only to entirely support the armature in overhung position from the bearing member, fastening means holding the bearing member rigidly against the magnet, and means on the shaft whereby the armature may be rotated.

2. In a magneto electric generator, a permanent field magnet of the horse-shoe type, a rotatable armature having its axis positioned along the length of the magnet arms, an armature bearing member located at the outer ends of the magnet arms and having a depending flange in smooth surface contact with the magnet arms, a plate fastened to the magnet and to the bearing member so that the latter holds the armature in centered position between the poles of the magnet, and means whereby the armature may be rotated.

3. In a magneto electric generator, a permanent field magnet of the horse-shoe type having an inner cylindrical face with its axis of curvature along the length of the magnet arms, an armature having its axis coincident with said axis of curvature, an armature bearing member abutting the outer ends of the magnet arms and having a depending circular flange in smooth surface contact with side faces of the magnet arms, said bearing member forming a closure for the end of the magnet and positioning the armature in centered position between the poles of the magnet, plates fastened to the magnet over the space between the arms thereof forming side closures therefor and also fastened to the bearing member holding it rigidly in place, and means whereby the armature may be rotated.

4. In a magneto electric generator, a permanent field magnet of the horse-shoe type, a rotatable armature positioned within the magnet between the poles thereof, a bearing for supporting the armature in position, a transverse support located within and fastened to the magnet, members fastened to the support and to the bearing to thereby hold the bearing in position, and means whereby the armature may be rotated; substantially as described.

5. In a magneto electric generator, a permanent field magnet of the horse-shoe type, a rotatable armature positioned within the magnet between the poles thereof, an outboard bearing for supporting the armature in position and constituting an end closure for the magnet, a transverse support located within and fastened to the magnet, members fastened to the support and to the bearing to thereby hold the bearing in position, and means whereby the armature may be located; substantially as described.

6. In a magneto electric generator, a permanent field magnet of the horse-shoe type, a rotatable armature positioned within the magnet between the poles thereof, a bearing for supporting the armature in position, a transverse support fastened to the magnet, plates constituting a closure for the open spaces between the arms of the magnet, and means whereby the armature may be rotated, each of said plates being fastened to the transverse support and to the bearing to thereby hold the bearing in position; substantially as described.

7. In a magneto electric generator, a permanent field magnet of the horse-shoe type, a rotatable armature positioned within the magnet between the poles thereof, an outboard bearing for the armature constituting an end closure for the magnet, side plates fastened to the magnet and to the bearing to thereby hold the bearing in position, and means whereby the armature may be rotated, said side plates constituting a closure for the open spaces between the arms of the magnet; substantially as described.

8. In a magneto electric generator, a permanent field magnet of the horse-shoe type, a rotatable armature positioned within the magnet between the poles thereof with its axis along the length of the arms of the magnet, a bearing attached to the magnet for holding the armature in position at one end only, a spring bracket fastened to the bearing and adapted to be fastened to a support for the magneto, and means whereby the armature may be rotated; substantially as described.

9. In a magneto electric generator, a permanent field magnet of the horse-shoe type, a rotatable armature positioned within the magnet between the poles thereof, an outboard bearing attached to the magnet, an armature shaft passing through the bearing and furnishing the sole support for the armature, a friction roller fastened on the outer end of the shaft, and a spring bracket fastened to the bearing and adapted to be fastened to a support for the magneto; substantially as described.

10. In a magneto electric generator, a one-piece permanent field magnet of the horse-shoe type having arms with a substantially annular-shaped cross section and with flat surfaces adjacent the open spaces between the arms, a rotatable armature positioned within the magnet between the poles thereof with its axis along the length of the arms, an outboard bearing, a transverse support fastened intermediate of the outer ends of the arms of the magnet, side plates seated on the flat outer surfaces of the magnet, and fastened to the transverse support and to the bearing to thereby hold the bearing in position, an armature shaft passing through the bearing, a friction roller fastened on the outer end of the shaft, and a spring bracket fastened to the bearing and adapted to be fastened to a support for the magneto; substantially as described.

In testimony whereof I have affixed my signature.

JOHANN GEISSLINGER.

---

It is hereby certified that in Letters Patent No. 1,210,638, granted January 2, 1917, upon the application of Johann Geisslinger, of Geneva, Switzerland, for an improvement in "Dynamo-Electric Machines," an error appears in the printed specification requiring correction as follows: Page 2, lines 74–75, claim 5, for the word "located" read *rotated*; and that the said Letters Patent should be read with this correction therein that the same may conform to the record of the case in the Patent Office.

Signed and sealed this 6th day of February, A. D., 1917.

[SEAL.]

R. F. WHITEHEAD,
*Acting Commissioner of Patents.*

Cl. 171—209.